United States Patent
Manceau

[11] 4,005,961
[45] Feb. 1, 1977

[54] PIVOTALLY MOUNTED INJECTION MOLDING APPARATUS

[75] Inventor: Marcel Manceau, Montlhery, France

[73] Assignee: Creusot-Loire, Paris, France

[22] Filed: Aug. 26, 1975

[21] Appl. No.: 608,008

[30] Foreign Application Priority Data
Aug. 26, 1974 France .............................. 74.29160

[52] U.S. Cl. .............................. 425/190; 425/188;
425/242 R
[51] Int. Cl.[2] .......................................... B29F 1/00
[58] Field of Search ............... 425/188, 190, 242 R

[56] References Cited
UNITED STATES PATENTS

| | | | |
|---|---|---|---|
| 3,034,175 | 8/1973 | Hehl | 425/190 |
| 3,564,658 | 2/1971 | Hehl | 425/188 |
| 3,751,203 | 5/1962 | Hehl | 425/190 |

Primary Examiner—Francis S. Husar
Assistant Examiner—Carl Rowold
Attorney, Agent, or Firm—Cameron, Kerkam, Sutton, Stowell & Stowell

[57] ABSTRACT

In an injection moulding machine, the mould closure unit and injection unit are mounted on two arms articulated about a central pivot and each resting on the machine frame at a bearing point, the spacing of which is variable, the arms being relatively movable between a position for injection centrally of the mould and in which the arms are in extension one of the other, and a position for injection in the joint plane of the mould and in which the arms are substantially perpendicular to one another, the joint plane including the axis of the central pivot.

5 Claims, 5 Drawing Figures

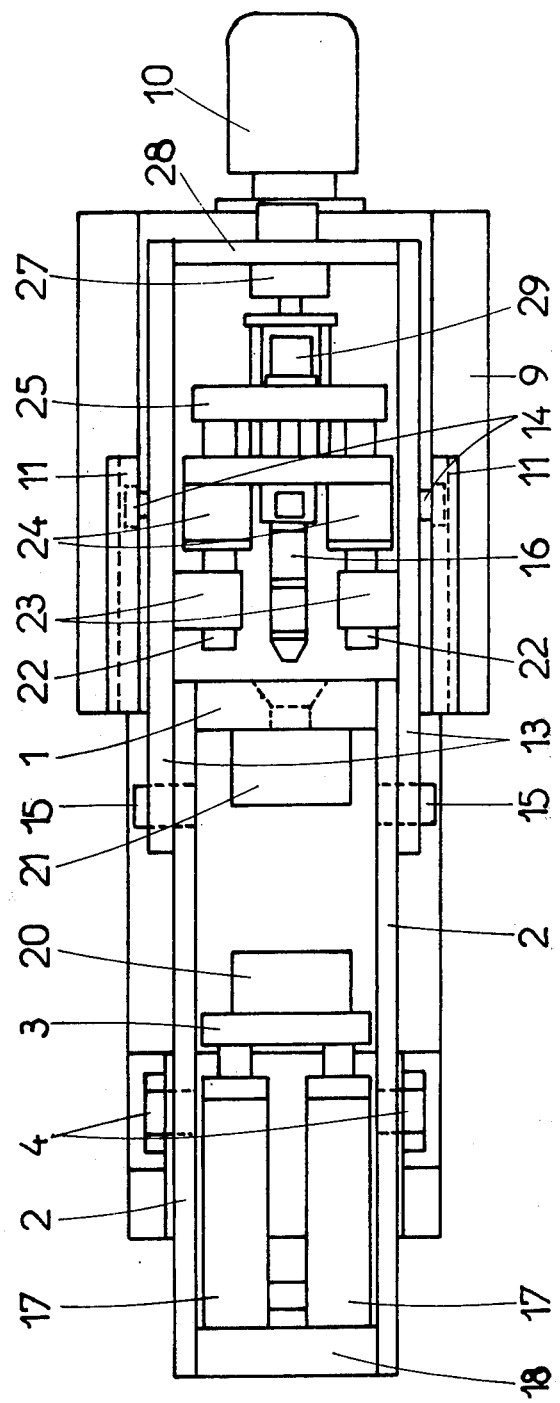

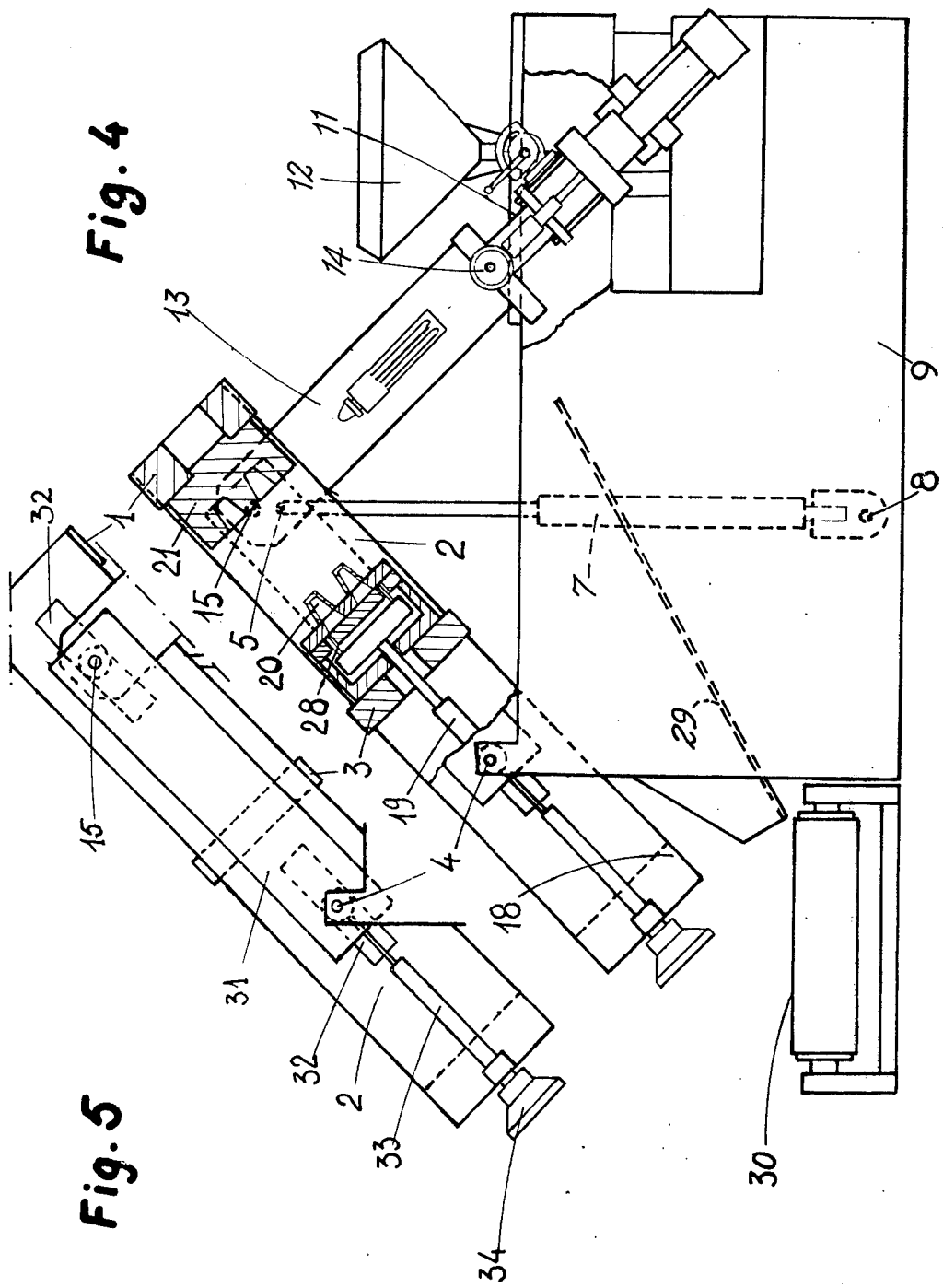

PIVOTALLY MOUNTED INJECTION MOLDING APPARATUS

The present invention relates to a machine for injection moulding material such as thermoplastics, thermosetting plastics or elastomers.

Injection machines normally comprise a mould made up of two interengaging parts, a core and a die, a mould closure unit and an injection unit, the components being mounted on a frame and provided with means for supplying material for injection and means for controlling the closure of the mould and injection.

The closure unit normally comprises two plates, one of which is fixed and the other movable, and on which the core and the die are fixed. The two plates are mounted on an arm along which the movable plate can slide.

For the injection moulding of components of various shapes under proper conditions, it must be possible for injection to be effected either at the centre of the mould or in the joint plane. To this end, the machine comprises means for displacing one of the closure units and the injection unit in relation to the frame, so that injection may be effected in either of the two positions, the closure unit and the injection unit being situated in extension of one another for injection at the centre or forming an angle of 90° with one another for injection in the joint plane.

It has already been proposed to make one of the units, e.g. the injection unit, free to swivel so that it can be placed in the two positions for injection in two directions at right angles to one another. Generally, however, the injection unit is overhung beyond the point of articulation on the frame and there is a consequent risk of column flexure. When the injection unit is made to be detachable, the operation of changing the orientation is relatively lengthy.

This invention relates to improvements whereby injection can be carried out in at least two positions, i.e. at the centre and in the joint plane, while retaining good machine stability and good access to the mould without complicating the machine design.

According to the invention there is provided an injection moulding machine comprising a frame, a closure unit for a mould comprising two interengaging parts, an injection unit, means for supplying material for injection to said injection unit, and means for controlling mould closure and injection, wherein said closure unit and said injection unit are mounted on a respective one of two arms articulated about a central pivot and each resting on said frame at a bearing point, said two bearing points having a variable spacing, and means are provided for relatively moving said arms of said pair of compasses between a position for injection centrally of the mould, in which said arms are situated in extension of one another, and a position for injection in the joint plane of the mould, in which said arms are substantially perpendicular to each other, the mould joint plane including said central pivot axis.

In a preferred embodiment, in the joint plane injection position the central pivot axis is situated above the bearing points on the frame so that injection is effected beneath the mould.

The closure unit may be mounted to slide along the other arm and means are provided for adjustment of the joint plane position relative to the axis of the injection nozzle by sliding the closure unit along the other arm.

The invention will be more fully understood from the following description of embodiments thereof, given by way of example only, with reference to the accompanying drawings. In the drawings:

FIG. 3 is a top plan view of the machine of FIG. 1 in the central injection position;

FIG. 4 is another embodiment according to the invention in the joint plane injection position;

FIG. 5 is a detail of the mould closure unit of the machine of FIG. 4.

Figure 1:
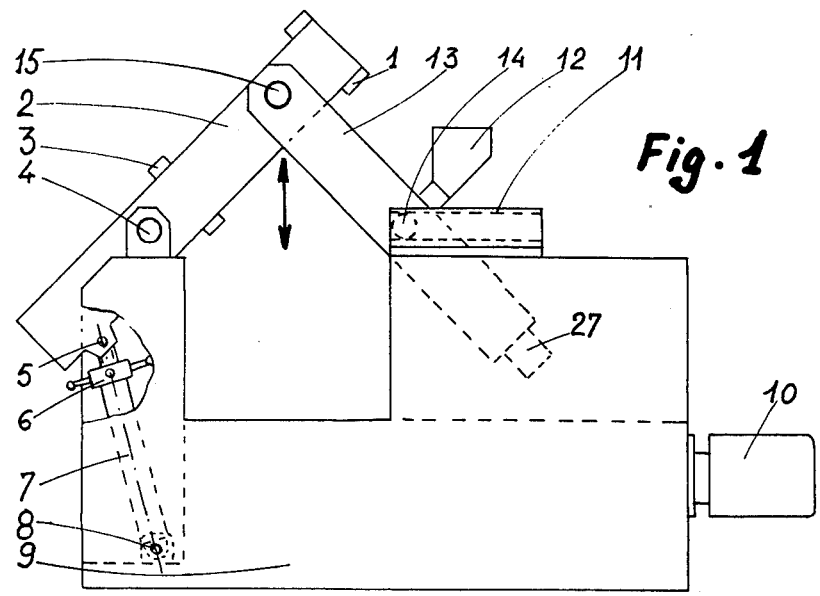
FIG. 1 is an elevation of an embodiment according to the invention in the position for injection in the mould joint plane.
Figure 2:
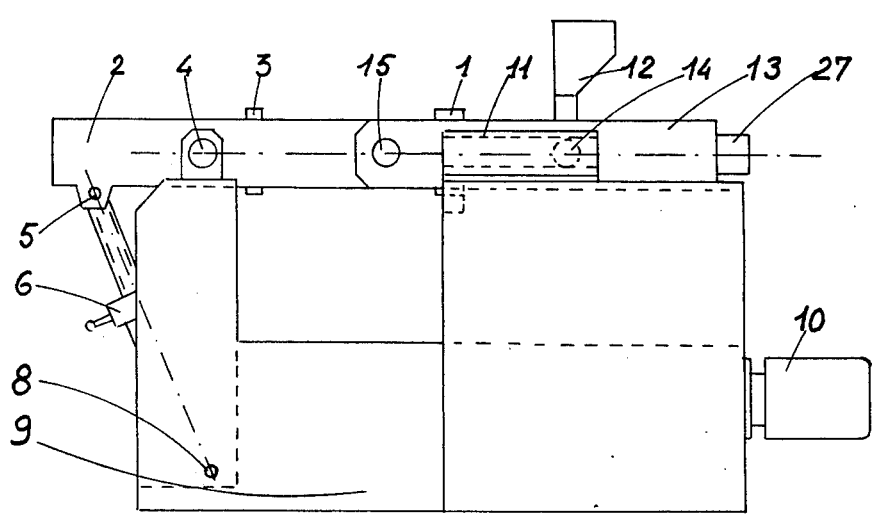
FIG. 2 is an elevation of the machine of FIG. 1 in a position for injection centrally of the mould.

The injection moulding machine shown in FIGS. 1 to 3 comprises a frame 9 on which are mounted hydraulic control means for the closure unit and for plastics injection, the system being driven by a motor 10.

A closure unit is mounted on an arm comprising two parallel plates 2 interconnected by two parallel plates 1 and 18 perpendicular to plates 2. Plate 1 is the fixed plate on which a mould part 21 bears, the other mould part 20 (FIG. 3) is mounted on a movable plate 3 which is slidable along the arms 2 under the control of jacks 17. The system is articulated on the frame 9 about trunnions 4.

Adjacent the ends of the plates 2 bearing the fixed plate 1 the plates 2 are pivotally connected by trunnions 15 to one end of an arm bearing the injection unit and comprising two parallel plates 13 articulated at one end on trunnions 15 and interconnected at the other end by a plate 28 (FIG. 3) perpendicular to plates 13, the arm bearing on the frame 9 through two pivots 14 which are slidable in guides 11.

The injection unit consists, in known manner, of an injection block comprising a cross-member 24 which is supported at the front by two columns 22 which are slidable in two guide bosses 23 fixed to the plate 13, the rear being supported by a jack 27. The injection block bears a sleeve and screw system 16 pushed by a rocking lever 25. The screw is rotated by a hydraulic motor 29. For injection purposes, the front of the sleeve 16 penetrates in known manner into an aperture formed for this purpose in the mould and opening, as required, either into the mould centre or into the joint plane.

It will be seen that the injection unit and the closure unit are joined at the central pivot 15 which is free and can move vertically, the two arms 2 and 13 bearing on the frame through the agency of the pivots 4 and 14, the spacing of which may vary. Opening of the arms is controlled, for example, by a screw jack 7 bearing a lever nut 6 and articulated on the arm of the closure unit about a pivot 5 and on the frame about a pivot 8.

Held by the jack 7 in this way, the compasses form a non-deformable triangular system, the opening of which will vary according to the spacing of the pivots 4 and 14. However, since injection is normally carried out either at the centre or in the joint plane, i.e. in two positions angularly spaced by 90° C, the arms normally assume one of only two positions shown in FIGS. 1 and 2, the plates 2 and 13 being either perpendicular (FIG. 1) for injection in the joint plane, or in extension of one another (FIG. 2) for injection at the centre.

Thus with the above described machine it is possible for injection to be carried out in two positions having a simple and rigid installation bearing on the frame at at least two points and possibly three points in the centre injection position, the central pivot 15 then bearing on the frame when the arms are situated in extension of one another.

It will be seen that the changeover from one injection position to the other is effected without dismantling the closure unit or the injection unit. Of course the way in which the plastics injection screw is fed with plastics must be adapted to the inclination of the injection unit. As shown in FIGS. 1 and 2 it is possible to use a feed hopper 12, the orientation of which changes according to the position of the apparatus. Alternatively the hopper may be replaced by a flexible pipe with material suction. Alternatively, as shown in FIG. 4, a swivelling hopper may be used.

Another important advantage of the above described machine is that injection in the joint plane is effected from beneath the mould as will be seen in FIG. 1. In presses used heretofore for injecting in the two positions, the closure unit was usually horizontal and the injection unit could assume a position either in extension of the mould, for injection at the centre, or above the mould for injection in the joint plane, which was then carried out from above. When injection is effected from below there is no risk of the material flowing after plasticizing, since the end of the sleeve is simply held in position in the injection aperture to block the latter.

Other advantages of the above described machine will be more readily understood from FIG. 4, which is a more detailed view showing the two mould parts, i.e. a core 20 which is adapted to fit into a die 21.

As shown in FIG. 4, the core 20 is placed on the movable plate 3, i.e. below the die 21 on the fixed plate 1, the latter being above the pivot 15. In this position it is a simple matter to place metal inserts on the core, the inserts resting in place simply by gravity. On opening of the mould, the moulding will be released from the die and remain on the core 20. To eject it, a jack 19 is used, for example, to control rods 28 which release the moulding, the latter then falling by gravity on to an inclined chute 29 which removes it to a conveyor belt 30.

If the moulded component does not include any metal inserts, it is preferable to fix the core 20 on the fixed plate 1, the die then being mounted on the movable plate 3, i.e. beneath the core. In this case, when the mould is opened, after injection and setting of the material, the moulding will drop by gravity on to the discharge chute 29.

It will be seen in both cases that the components can be ejected automatically downwardly without any risk of its dropping back on to the mould, this being a disadvantage encountered in known presses.

It will be appreciated that the joint plane must always be situated on the axis of the injection unit, the latter being required to intersect the pivot axis of the trunnions 15 for injection to be possible in the two positions.

In the simple embodiment shown in FIGS. 1 to 3, moulds are used which are designed so that in the joint plane injection position the joint plane passes through the central pivot axis. However, in some cases it may be advantageous to provide for adjustment of the joint plane position so that moulds of any type can be used.

An arrangement of this kind is shown in FIGS. 4 and 5.

The pivots 4 and 15 are connected by two links 31. A screw 33, bearing on the pivots 4 and on the plate 18 and controlled by a handle 34, enables the closure unit to be slid longitudinally in the direction passing through the pivots 4 and 15, the closure unit being guided, for example, by pivots 4 and 15 running in slots 32 in plates 2. In this way it is possible to adjust the position of the joint plane relative to the injection axis.

Of course the invention is not intended to be limited to the embodiments described hereinbefore by way of example only, the details of which may be modified by the use of alternative or equivalent means.

What is claimed is:
1. An injection moulding machine comprising:
   a frame;
   a closure unit including a mould comprising two mould parts interengaging in a joint plane;
   an injection unit; and
   means associated with and supplying material for injection to said injection unit;
   means operatively associated with said arms for controlling mould closure and injection;
   a pair of arms articulated about a central pivot and each supported on said frame at a bearing point, means associated with said frame for varying the spacing of said bearing points;
   means mounting said injection unit on one of said arms;
   means mounting said closure unit on the other of said arms; and
   means associated with said arms for relatively moving said arms in a compass-like manner between a first position for injection centrally of said mould, in which first position said arms are in extension of each other, and a second position for injection in said joint plane of said mould, in which second position said arms are substantially perpendicular to each other, said joint plane including said central pivot axis.

2. A machine according to claim 1, wherein in said second injection position said central pivot axis is above said bearing points on said frame, for injection beneath said mould.

3. A machine according to claim 2 wherein said mould comprises a core part and a die part supported by two plates one of said plates being fixed and the other of said plates being movable relative to said closure unit, said fixed plate being above said central pivot axis and supporting said core part so that the moulded product will fall by gravity from said mould when said mould is opened.

4. A machine according to claim 2 wherein said mould comprises a core part and a die part supported by two plates, one of said plates being fixed and the other of said plates being movable relative to said closure unit, said movable plate being below said central pivot axis and supporting said core for mounting inserts on said core before closure of said mould.

5. A machine according to claim 1, including means mounting said closure unit for sliding movement along said other arm and means for adjusting the position of said joint plane by sliding said closure unit along said other arm.

* * * * *